US012680045B2

(12) United States Patent
Goto et al.

(10) Patent No.: US 12,680,045 B2
(45) Date of Patent: Jul. 14, 2026

(54) PRESSURE MEDIUM AND METHOD FOR USING PRESSURE MEDIUM

(71) Applicant: IDEMITSU KOSAN CO., LTD., Tokyo (JP)

(72) Inventors: Kenji Goto, Chiba (JP); Yusuke Nakanishi, Chiba (JP); Keizo Murata, Ushiku (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 18/294,224

(22) PCT Filed: Aug. 29, 2022

(86) PCT No.: PCT/JP2022/032316
§ 371 (c)(1),
(2) Date: Feb. 1, 2024

(87) PCT Pub. No.: WO2023/027192
PCT Pub. Date: Mar. 2, 2023

(65) Prior Publication Data

US 2024/0343989 A1 Oct. 17, 2024

(30) Foreign Application Priority Data

Aug. 27, 2021 (JP) ................................ 2021-139185

(51) Int. Cl.

| | |
|---|---|
| ***C10M 105/76*** | (2006.01) |
| ***B01J 3/06*** | (2006.01) |
| *C10N 20/02* | (2006.01) |
| *C10N 40/00* | (2006.01) |

(52) U.S. Cl.
CPC .............. *C10M 105/76* (2013.01); *B01J 3/06* (2013.01); *C10N 2020/02* (2013.01); *C10N 2040/44* (2020.05)

(58) Field of Classification Search
CPC .............. C10M 105/76; C10M 139/02; C10M 139/04; B01J 3/06; C10N 2020/02; C10N 2040/44; C10N 2040/08
See application file for complete search history.

(56) References Cited

U.S. PATENT DOCUMENTS

| | | | | |
|---|---|---|---|---|
| 3,713,289 A * | 1/1973 | Somekh | F01K 25/08 60/645 |
| 10,338,372 B2 * | 7/2019 | Leguijt | C07F 7/30 |
| 2009/0071870 A1 | 3/2009 | Aoyama et al. | |
| 2015/0370062 A1 | 12/2015 | Leguijt et al. | |

(Continued)

FOREIGN PATENT DOCUMENTS

| | | | |
|---|---|---|---|
| GB | 792198 | * | 3/1958 |
| JP | 2011-132285 | A | 7/2011 |
| JP | 5319071 | * | 10/2013 |

(Continued)

OTHER PUBLICATIONS https://pubchem.ncbi.nlm.nih.gov/compound/58555188 (5-Butyl-5-propyldecane ); 2012 (Year: 2012).*
https://pubchem.ncbi.nlm.nih.gov/compound/519401(4,4-dipropylheptane); 2005 (Year: 2005).*
International Search Report and Written Opinion issued Nov. 15, 2022, in PCT/JP2022/032316 (with English Translation), 13 pages.
Fukaya et al., "Direct synthesis of tetraalkoxysilanes from silica and alcohols", New Journal of Chemistry, vol. 41, 2017, pp. 2224-2226, XP055902862.
Extended European Search Report issued Jul. 18, 2025 in European Patent Application No. 22861480.6, 7 pages.
Japanese Office Action issued Apr. 15, 2025 in Japanese Patent Application No. 2021-139185 (with English translation), 8 pages.
URL: https://xumuk.ru/organika/36.html, published in Wayback Archive Machine Oct. 15, 2007 (with English machine translation).

(Continued)

*Primary Examiner* — Cephia D Toomer
(74) *Attorney, Agent, or Firm* — Oblon, McClelland, Maier & Neustadt, L.L.P.

(57) ABSTRACT

A pressure medium containing at least one Group-14 element-containing organic compound (A) selected from the group consisting of a compound (A1) represented by the general formula (a1) and a compound (A2) represented by the general formula (a2):

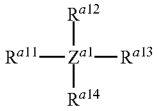

(a1)

where each of $R^{a11}$, $R^{a12}$, $R^{a13}$, and $R^{a14}$ independently represents an alkyl group having 3 to 6 carbon atoms, and $Z^{a1}$ represents a carbon atom or a silicon atom:

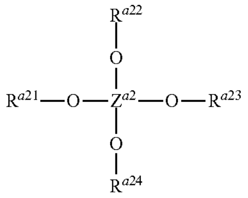

(a2)

where each of $R^{a21}$, $R^{a22}$, $R^{a23}$, and $R^{a24}$ independently represents an alkyl group having 3 to 6 carbon atoms, and $Z^{a2}$ represents a silicon atom, a germanium atom, a tin atom, or a lead atom.

8 Claims, No Drawings

(56) References Cited

U.S. PATENT DOCUMENTS

| | | | |
|---|---|---|---|
| 2017/0283730 | A1 | 10/2017 | Aoki et al. |
| 2020/0347082 | A1 | 11/2020 | Fukaya et al. |

FOREIGN PATENT DOCUMENTS

| | | | |
|---|---|---|---|
| RU | 2697550 | | 10/2018 |
| WO | WO 2007/058064 | A1 | 5/2007 |
| WO | WO 2008/108356 | A1 | 9/2008 |
| WO | WO 2016/039468 | A1 | 3/2016 |

OTHER PUBLICATIONS

The article by O.V. Tinkov et al. Study of acute toxicity and physicochemical properties of organic compounds. Journal of the Siberian Federal University, 2012. 5(1), pp. 95-104 (with English machine translation).

URL: https://www.mrmiz.ru/article/v36/article 1.htm, published in the Wayback Archive Machine Oct. 10, 2006 (with English machine translation).

Oficial communication issued in RU application 2024104459 on Jan. 29, 2026 (with English machine translation).

* cited by examiner

PRESSURE MEDIUM AND METHOD FOR USING PRESSURE MEDIUM

CROSS REFERENCE TO RELATED APPLICATIONS

This application is a National Stage entry under 35 U.S.C. § 371 of PCT/JP2022/032316, filed on Aug. 29, 2022, and claims priority to Japanese Patent Application No. 2021-139185, filed on Aug. 27, 2021. The entire contents of both are incorporated herein by reference.

TECHNICAL FIELD

The present invention relates to a pressure medium and a method for using a pressure medium.

BACKGROUND ART

In recent years, research related to substance synthesis, research related to changes in physical properties of substances and the like have been widely performed under ultrahigh pressures of more than 1.0 GPa.

In these researches, it is necessary to apply an ultrahigh pressure to a substance in a hydrostatic manner. When an ultrahigh pressure is applied to a substance, a pressure medium is usually used.

Examples of the properties required for a pressure medium under an ultrahigh pressure include a property that the pressure medium can be maintained in the liquid state without solidifying over a wide pressure range. This is because, when the pressure medium is solidified in the middle of the pressure application, uniaxial compression coexists at a higher pressure, and uniform compression becomes impossible.

In recent years, various studies have been made on a pressure medium that satisfies such a required property. As an example, PLT 1 describes that a pressure medium oil including a 1-olefin oligomer achieves a solidification pressure at room temperature of 2.7 GPa.

CITATION LIST

Patent Literature

PLT 1: WO 2007/058064

SUMMARY OF INVENTION

Technical Problem

Though the pressure medium described in PLT 1 has a high solidification pressure at room temperature, in recent years, creation of a pressure medium that has a further higher solidification pressure is required.

In addition, from the viewpoint of safety, a pressure medium is required to have a flash point sufficiently higher than room temperature (for example, 60° C. or more).

A problem of the present invention is to provide a pressure medium, which has a solidification pressure at room temperature of more than 2.7 GPa and a flash point sufficiently higher than room temperature, and a method for using the pressure medium.

In the present specification, "room temperature" means 25° C.

Solution to Problem

According to the present invention, [1] to [2] below are provided.

[1] A pressure medium including at least one Group-14 element-containing organic compound (A) selected from the group consisting of a compound (A1) represented by the general formula (a1) and a compound (A2) represented by the general formula (a2):

(a1)

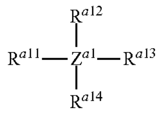

in which each of $R^{a11}$, $R^{a12}$, $R^{a13}$, and $R^{a14}$ independently represents an alkyl group having 3 to 6 carbon atoms, and $Z^{a1}$ represents a carbon atom or a silicon atom:

(a2)

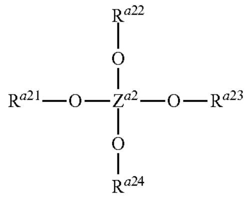

in which each of $R^{a21}$, $R^{a22}$, $R^{a23}$, and $R^{a24}$ independently represents an alkyl group having 3 to 6 carbon atoms, and $Z^{a2}$ represents a silicon atom, a germanium atom, a tin atom, or a lead atom.

[2] A method for using a pressure medium, which includes applying a pressure to a substance via the pressure medium according to the above [1].

Advantageous Effects of Invention

According to the present invention, a pressure medium, which has a solidification pressure at room temperature of more than 2.7 GPa and a flash point sufficiently higher than room temperature, and a method for using the pressure medium can be provided.

DESCRIPTION OF EMBODIMENTS

Upper limit values and lower limit values of numerical ranges described in this specification can be optionally combined. For example, when "A to B" and "C to D" are described as numerical ranges, the numerical ranges of "A to D" and "C to B" are also included in the scope of the present invention.

In addition, the numerical range "lower limit value to upper limit value" described in this specification means the lower limit value or more and the upper limit value or less, unless otherwise specified.

In addition, in the present specification, numerical values in the Examples are the numerical values that can be used as the upper limit value or lower limit value.

[Aspect of Pressure Medium]

The pressure medium of the present embodiment contains at least one Group-14 element-containing organic compound (A) selected from the group consisting of a compound (A1) represented by the general formula (a1) and a compound (A2) represented by the general formula (a2):

(a1)

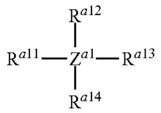

in which each of $R^{a11}$, $R^{a12}$, $R^{a13}$, and $R^{a14}$ independently represents an alkyl group having 3 to 6 carbon atoms, and $Z^{a1}$ represents a carbon atom or a silicon atom.

(a2)

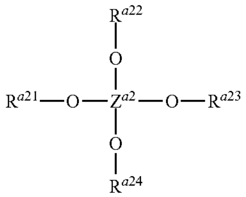

in which each of $R^{a21}$, $R^{a22}$, $R^{a23}$, and $R^{a24}$ independently represents an alkyl group having 3 to 6 carbon atoms, and $Z^{a2}$ represents a silicon atom, a germanium atom, a tin atom, or a lead atom.

The present inventors have made assiduous studies to solve the above problems. As a result, the present inventors have found that the above problems can be solved by at least one Group-14 element-containing organic compound (A) (hereinafter may be also referred to as "component (A)") selected from the group consisting of a compound (A1) represented by the general formula (a1) and a compound (A2) represented by the general formula (a2).

Though the reason why the solidification pressures of the compound (A1) and the compound (A2) are high is not clear, the appropriate overlap balance between the electron orbit of the center atom that constitutes these compounds and the electron orbit of the alkyl group or alkoxy group surrounding the center atom is presumably part of the reason.

The pressure medium of the present embodiment is preferably composed only of the component (A), but can contain components other than the component (A) as long as the effects of the present invention are not significantly impaired.

In the pressure medium of the present embodiment, the content of the component (A) is preferably from 70% by mass to 100% by mass, more preferably from 80% by mass to 100% by mass, still more preferably from 90% by mass to 100% by mass, still more preferably from 95% by mass to 100% by mass, and still more preferably from 98% by mass to 100% by mass based on the total amount of the pressure medium.

Each component contained in the pressure medium of the present embodiment will be described in detail below.

[Component (A)]

The pressure medium of the present embodiment contains a component (A).

The component (A) is at least one selected from the group consisting of a compound (A1) represented by the general formula (a1) and a compound (A2) represented by the general formula (a2).

As the compound (A1) represented by the general formula (a1), one type can be used alone, or two or more types can be used in combination.

As the compound (A2) represented by the general formula (a2), one type can be used alone, or two or more types can be used in combination.

From the viewpoint of further easily increasing the solidification pressure at room temperature, the component (A) preferably contains the compound (A2) represented by the general formula (a2), and is more preferably composed of the compound (A2).

When the component (A) contains the compound (A2) represented by the general formula (a2), the content of the compound (A2) is preferably from 50% by mass to 100% by mass, more preferably from 60% by mass to 100% by mass, still more preferably from 70% by mass to 100% by mass, still more preferably from 80% by mass to 100% by mass, and still more preferably from 90% by mass to 100% by mass based on the total amount of the component (A).

The compound (A1) and the compound (A2) will be described in detail below.

<Compound (A1)>

The compound (A1) is a compound represented by the general formula (a1).

(a1)

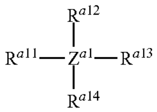

In the general formula (a1), each of $R^{a11}$, $R^{a12}$, $R^{a13}$, and $R^{a14}$ independently represents an alkyl group having 3 to 6 carbon atoms.

When the alkyl group has 2 or less carbon atoms, it is difficult to make the flash point sufficiently higher than room temperature.

When the alkyl group has 7 or more carbon atoms, the solidification pressure becomes low. When electrical conductivity measurement or the like is performed under an ultrahigh pressure, a conductive paste may be used for the electrode. When the alkyl group has 7 or more carbon atoms, the conductive paste may be dissolved.

Though $R^{a11}$, $R^{a12}$, $R^{a13}$, and $R^{a14}$ can be the same alkyl group or different alkyl groups, $R^{a11}$, $R^{a12}$, $R^{a13}$, and $R^{a14}$ are preferably the same alkyl group from the viewpoint of making the effects of the present invention more easily exhibited.

In the present specification, the "same alkyl group" means an alkyl group having the same number of carbon atoms and the same structure.

From the viewpoint of making the effects of the present invention more easily exhibited (in particular, from the viewpoint of further easily increasing the solidification pressure), the alkyl group that can be selected as $R^{a11}$, $R^{a12}$, $R^{a13}$, and $R^{a14}$ preferably has 3 to 5, and more preferably has 4 carbon atoms.

The alkyl group that can be selected as $R^{a11}$, $R^{a12}$, $R^{a13}$, and $R^{a14}$ can be linear or branched, but is preferably linear from the viewpoint of making the effects of the present invention more easily exhibited.

In the general formula (a1), $Z^{a1}$ represents a carbon atom or a silicon atom.

From the viewpoint of making the effects of the present invention more easily exhibited, $Z^{a1}$ is preferably a silicon atom.

<Compound (A2)>

The compound (A2) is a compound represented by the general formula (a2).

(a2)

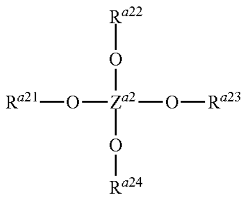

In the general formula (a2), each of $R^{a21}$, $R^{a22}$, $R^{a23}$, and $R^{a24}$ independently represents an alkyl group having 3 to 6 carbon atoms.

When the alkyl group has 2 or less carbon atoms, it is difficult to make the flash point sufficiently higher than room temperature.

When the alkyl group has 7 or more carbon atoms, the solidification pressure becomes low. When electrical conductivity measurement or the like is performed under an ultrahigh pressure, a conductive paste may be used for the electrode. When the alkyl group has 7 or more carbon atoms, the conductive paste may be dissolved.

Though $R^{a21}$, $R^{a22}$, $R^{a23}$, and $R^{a24}$ can be the same alkyl group or different alkyl groups, $R^{a21}$, $R^{a22}$, $R^{a23}$, and $R^{a24}$ are preferably the same alkyl group from the viewpoint of making the effects of the present invention more easily exhibited.

From the viewpoint of making the effects of the present invention more easily exhibited (in particular, from the viewpoint of further easily increasing the solidification pressure), the alkyl group that can be selected as $R^{a21}$, $R^{a22}$, $R^{a23}$, and $R^{a24}$ preferably has 3 to 5, more preferably has 3 to 4, and still more preferably has 3 carbon atoms.

The alkyl group that can be selected as $R^{a21}$, $R^{a22}$, $R^{a23}$, and $R^{a24}$ can be linear or branched, but is preferably linear from the viewpoint of making the effects of the present invention more easily exhibited.

In general formula (a2), $Z^{a2}$ represents a silicon atom, a germanium atom, a tin atom, or a lead atom.

From the viewpoint of making the effects of the present invention more easily exhibited (in particular, from the viewpoint of further easily increasing the solidification pressure), $Z^{a2}$ is preferably a silicon atom.

<Components Other than Component (A)>

The pressure medium of the present embodiment can contain other components other than the component (A) as long as the effects of the present invention are not significantly impaired, and does not need to contain other components other than the component (A).

Examples of such other components include at least one additive selected from antioxidants, corrosion inhibitors, extreme pressure agents, friction modifiers, rust inhibitors, anti-foaming agents, and viscosity index improvers.

The total content of these additives is preferably from 0.01% by mass to 30% by mass, more preferably from 0.01% by mass to 20% by mass, still more preferably from 0.05% by mass to 15% by mass, and still more preferably from 0.1% by mass to 10% by mass based on the total amount of the pressure medium.

The pressure medium of the present embodiment can contain a raw material compound or a by-product produced during synthesis of the component (A) as long as the effects of the present invention are not significantly impaired.

However, the contents of the raw material compound and the by-product are preferably small. Specifically, the contents of the raw material compound and the by-product are each independently preferably 5% by mass or less, more preferably 1% by mass or less, and still more preferably 0.1% by mass or less.

[Various Physical Properties of Pressure Medium]

<Solidification Pressure>

The pressure medium of the present embodiment has the solidification pressure at room temperature of more than 2.7 GPa. The solidification pressure is preferably more than 3.0 GPa, more preferably more than 3.5 GPa, still more preferably more than 4.1 GPa, still more preferably 4.5 GPa or more, still more preferably 5.0 GPa or more, and still more preferably 5.2 GPa or more.

Thus, the pressure medium of the present embodiment can maintain the liquid state and can sufficiently function as a pressure medium even under an ultrahigh pressure environment.

The upper limit value of the solidification pressure at room temperature of the pressure medium of the present embodiment is not particularly limited, the larger the upper limit value is, the better, and the upper limit value is usually less than 6.0 GPa.

In the present specification, the solidification pressure at room temperature means a value measured by the method described in Examples described later.

<Kinematic Viscosity at 40° C.>

In the pressure medium of the present embodiment, the kinematic viscosity at 40° C. is preferably more than 1.0 $mm^2/s$, more preferably 1.5 $mm^2/s$ or more, and still more preferably 2.0 $mm^2/s$ or more from the viewpoint of suppressing leakage from the pressure cell of the pressure medium during pressure application. It is usually 10 $mm^2/s$ or less.

In the present specification, the kinematic viscosity at 40° C. means a value measured according to JIS K2283:2000.

<Melting Point>

In the pressure medium of the present embodiment, the melting point is preferably-50° C. or less, more preferably −60° C. or less, and still more preferably −70° C. or less from the viewpoint of obtaining a pressure medium that does not solidify even at low temperature and can be used even in a low-temperature experiment.

The lower limit value of the melting point of the pressure medium of the present embodiment is not particularly limited, and is usually −100° C. or more.

In the present specification, the melting point means a value measured by a differential scanning calorimetry method (hereinafter, may be also simply referred to as "DSC method").

<Flash Point>

In the pressure medium of the present embodiment, the flash point is preferably 60° C. or more, more preferably 65° C. or more, and still more preferably 70° C. or more from the viewpoint of ensuring safety with a temperature sufficiently higher than room temperature.

The upper limit value of the flash point of the pressure medium of the present embodiment is not particularly limited, and is usually 100° C. or less.

In the present specification, the flash point means a value measured by Pensky-Martens closed cup method (PM method) according to JIS K2265-3:2007.

[Use of Pressure Medium]

The pressure medium of the present embodiment has the solidification pressure at room temperature of more than 2.7 GPa, and the flash point is sufficiently higher than room temperature.

Therefore, the pressure medium of the present embodiment is suitable as a pressure medium used in a pressure application system that applies a pressure to a substance.

Thus, according to the pressure medium of the present embodiment, methods (1) to (2) below are provided.

(1) A method for using a pressure medium, which includes applying a pressure to a substance via the pressure medium of the present embodiment.

(2) The method for using a pressure medium according to the above (1), in which the pressure is more than 2.7 GPa.

The method for using a pressure medium of the above (2) is performed under a room temperature environment or in a temperature range in the vicinity thereof.

However, after a predetermined pressure is applied to a substance via the pressure medium, the pressure medium can be cooled and solidified with the pressure being maintained, and the pressure can be continuously applied to the substance.

As described above, in the pressure medium of the present embodiment, the solidification pressure at room temperature is preferably more than 3.0 GPa, more preferably more than 3.5 GPa, still more preferably more than 4.1 GPa, still more preferably 4.5 GPa or more, still more preferably 5.0 GPa or more, and still more preferably 5.2 GPa or more.

Thus, the range of the pressure of the aspect of the above (2) can be any one of these ranges.

One Embodiment of the Present Invention Provided

According to one embodiment of the present invention, the following [1] to are provided.

[1] A pressure medium including at least one Group-14 element-containing organic compound (A) selected from the group consisting of a compound (A1) represented by the general formula (a1) and a compound (A2) represented by the general formula (a2):

(a1)

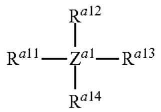

in which each of $R^{a11}$, $R^{a12}$, $R^{a13}$, and $R^{a14}$ independently represents an alkyl group having 3 to 6 carbon atoms, and $Z^{a1}$ represents a carbon atom or a silicon atom:

(a2)

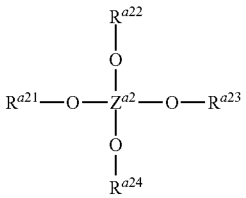

in which each of $R^{a21}$, $R^{a22}$, $R^{a23}$, and $R^{a24}$ independently represents an alkyl group having 3 to 6 carbon atoms, and $Z^{a2}$ represents a silicon atom, a germanium atom, a tin atom, or a lead atom.

[2] The pressure medium according to the above [1], in which in the general formula (a1), $R^{a11}$, $R^{a12}$, $R^{a13}$, and $R^{a14}$ represent the same alkyl group.

[3] The pressure medium according to the above [1] or [2], in which in the general formula (a2), $R^{a21}$, $R^{a22}$, $R^{a23}$, and $R^{a24}$ represent the same alkyl group.

[4] The pressure medium according to any one of the above [1] to [3], in which in the general formula (a1), $Z^{a1}$ represents a silicon atom.

[5] The pressure medium according to any one of the above [1] to [4], in which in the general formula (a2), $Z^{a2}$ represents a silicon atom.

[6] The pressure medium according to any one of the above [1] to [5], which has a solidification pressure at 25° C. of more than 4.1 GPa.

[7] The pressure medium according to any one of the above [1] to [6], which has a kinematic viscosity at 40° C. of more than 1.0 $mm^2/s$.

[8] The pressure medium according to any one of the above [1] to [7], which has a melting point of −50° C. or less.

[9] The pressure medium according to any one of the above [1] to [8], which has a flash point of 70° C. or more.

[10] The pressure medium according to any one of the above [1] to [9], in which the content of the Group-14 element-containing organic compound (A) is from 70% by mass to 100% by mass based on the total amount of the pressure medium.

[11] A method for using a pressure medium, which includes applying a pressure to a substance via the pressure medium according to any one of the above [1] to [10].

[12] The method for using a pressure medium according to the above [11], in which the pressure is more than 4.1 GPa.

EXAMPLES

The present invention will be specifically described by the following Examples, but the present invention is not limited to the following Examples.

Examples 1 to 3 and Comparative Examples 1 to 3

Various physical properties of the following (1) to (4) were measured or evaluated on a pressure medium composed of any of the following compounds.

Example 1

Tetra-n-propoxysilane

In the general formula (a2), each of $R^{a21}$, $R^{a22}$, $R^{a23}$, and $R^{a24}$ represents an n-propyl group, $Z^{a2}$ represents a silicon atom, and this is a compound corresponding to the compound (A2).

Example 2

Tetra-n-butoxysilane

In the general formula (a2), each of $R^{a21}$, $R^{a22}$, $R^{a23}$, and $R^{a24}$ represents an n-butyl group, $Z^{a2}$ represents a silicon atom, and this is a compound corresponding to the compound (A2).

Example 3

Tetra-n-butylsilane

In the general formula (a1), each of $R^{a11}$, $R^{a12}$, $R^{a13}$, and $R^{a14}$ represents an n-butyl group, $Z^{a1}$ represents a silicon atom, and this is a compound corresponding to the compound (A1).

Comparative Example 1

Hexaethyldisiloxane

This is a compound represented by the following structural formula:

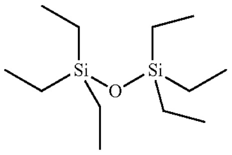

Comparative Example 2

Tetrakis(trimethylsiloxy)silane

This is a compound represented by the following structural formula:

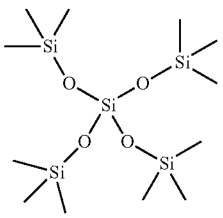

Comparative Example 3

Tetraethoxysilane

This is a compound in which in the general formula (a2), each of $R^{a21}$, $R^{a22}$, $R^{a23}$, and $R^{a24}$ represents an ethyl group.

[Method for Measuring or Evaluating Various Physical Properties]

(1) Kinematic Viscosity at 40° C.

The measurement was performed according to JIS-K2283:2000.

(2) Melting Point

The measurement was performed by DSC method.

(3) Flash Point

The measurement was performed by Pensky-Martens closed cup method (PM method) according to JIS K2265-3:2007.

(4) Solidification Pressure

In an environment of 25° C., a strain gauge was put in a pressure container formed in a cubic form, and the pressure container was filled with a pressure medium. For applying an ultrahigh pressure, the pressure container was pressurized in 6 directions, and the resistance value of the strain gauge at this time was measured. The relationship between the pressure and the resistance value was graphed, and the point at which the curve of the resistance value relative to the pressure folds discontinuously is identified as a solidification pressure point.

The strain gauge is a tabular measurement device, and when compressed more, the resistance value lowers. When the pressure medium maintains the liquid state, the entire device is uniformly compressed and contracted, and the compression of the device can be detected, but when pressurized via a solidified pressure medium, the compression of the solidified pressure medium is detected and therefore, the compression ratio of the strain gauge is increased, so that the resistance value is decreased rapidly across the solidification pressure point border. Consequently, in the graph of the relationship of the pressure and the resistance value, a point at which the curve of the resistance value relative to the pressure folds appears, and the point is identified as "solidification pressure point".

In the case where temperature control at 25° C. is difficult, the sample may be analyzed at two temperatures near 25° C. (temperature lower than 25° C. and temperature higher than 25° C.), and as a linear interpolation value, the solidification pressure at 25° C. may be calculated.

The results are shown in Table 1.

TABLE 1

| | Unit | Example 1 | Example 2 | Example 3 |
|---|---|---|---|---|
| Compound | — | Tetra-n-propoxysilane | Tetra-n-butoxysilane | Tetra-n-butylsilane |
| Molecular weight | g/mol | 264.4 | 320.5 | 256.6 |
| Kinematic viscosity at 40° C. | $mm^2/s$ | 1.66 | 2.33 | 1.702 |
| Melting point | ° C. | −80 | −80 | −56 |
| Flash point (PM method) | ° C. | 95 | 78 | 75 |
| Solidification pressure | GPa | 5.5 | 3.5 | 5.1 |

| | Unit | Comparative Example 1 | Comparative Example 2 | Comparative Example 3 |
|---|---|---|---|---|
| Compound | — | Hexaethyldisiloxane | Tetrakis(trimethylsiloxy)silane | Tetraethoxysilane |
| Molecular weight | g/mol | 245.5 | 384.8 | 208.3 |
| Kinematic viscosity at 40° C. | $mm^2/s$ | 2.35 | — | — |

TABLE 1-continued

| | | | | |
|---|---|---|---|---|
| Melting point | ° C. | −115 | −60 | — |
| Flash point (PM method) | ° C. | 76 | 80 | 56 |
| Solidification pressure | GPa | 1.25 | 0.2 | — |

Table 1 shows the following.

Each pressure medium of Examples 1 to 3 has a high solidification pressure and a flash point sufficiently higher than room temperature.

On the other hand, each pressure medium of Comparative Examples 1 and 2 has a low solidification pressure.

The pressure medium of Comparative Example 3 has a low flash point.

Whether a conductive paste is dissolved or not in each pressure medium of Examples 1 to 3 and Comparative Examples 1 to 3 was checked and it was confirmed that a conductive paste was not dissolved in any of the pressure media of Examples 1 to 3 and Comparative Examples 1 to 3.

The invention claimed is:

1. A method, comprising:

applying a pressure to a substance via a pressure medium, the pressure medium comprising:

at least one Group-14 element-containing organic compound of formula (a2):

(a2)

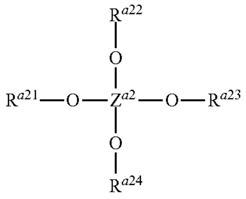

wherein each of $R^{a21}$, $R^{a22}$, $R^{a23}$, and $R^{a24}$ is an alkyl group having 3 carbon atoms, and $Z^{a2}$ is a silicon atom.

2. The method according to claim 1, wherein $R^{a21}$, $R^{a22}$ $R^{a23}$, and $R^{a24}$ are each the same alkyl group.

3. The method according to claim 1, wherein a solidification pressure at 25° C. of the pressure medium is more than 4.1 GPa.

4. The method according to claim 1, wherein a kinematic viscosity at 40° C. of the pressure medium is more than 1.0 $mm^2/s$.

5. The method according to claim 1, wherein a melting point of the pressure medium is −50° C. or less.

6. The method according to claim 1, wherein a flash point of the pressure medium is 70° C. or more.

7. The method according to claim 1, wherein a content of the at least one Group-14 element-containing organic compound of formula (a2) is from 70% by mass to 100% by mass based on a total amount of the pressure medium.

8. The method according to claim 1, wherein the pressure is more than 4.1 GPa.

* * * * *